United States Patent
Jackson et al.

(10) Patent No.: US 10,969,030 B2
(45) Date of Patent: Apr. 6, 2021

(54) BUSHING HAVING A SHAFT SEAL

(71) Applicant: Fisher Controls International LLC, Marshalltown, IA (US)

(72) Inventors: Trenton Frank Jackson, Marshalltown, IA (US); Wade Jonathon Helfer, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 13 days.

(21) Appl. No.: 15/824,730

(22) Filed: Nov. 28, 2017

(65) Prior Publication Data

US 2019/0162325 A1    May 30, 2019

(51) Int. Cl.
*F16K 27/04* (2006.01)
*F16K 31/12* (2006.01)
*F16J 15/3252* (2016.01)
*F16J 15/06* (2006.01)
*F16K 41/04* (2006.01)

(52) U.S. Cl.
CPC ........... *F16K 27/041* (2013.01); *F16J 15/061* (2013.01); *F16J 15/3252* (2013.01); *F16K 27/048* (2013.01); *F16K 31/12* (2013.01); *F16K 41/04* (2013.01)

(58) Field of Classification Search
CPC ...... F16K 27/041; F16K 31/12; F16K 27/048; F16K 41/02; F16K 1/224; F16K 1/2028; F16J 15/3252; F16J 15/061
USPC .................................................. 251/326, 214
See application file for complete search history.

(56) References Cited

U.S. PATENT DOCUMENTS

| | | | |
|---|---|---|---|
| 3,544,068 A | 12/1970 | Rice | |
| 3,612,483 A * | 10/1971 | Pool | F16K 1/226 251/306 |
| 3,991,974 A * | 11/1976 | Bonafous | F16K 1/2265 251/306 |
| 5,979,483 A * | 11/1999 | Zapalac | F16K 41/003 137/15.01 |
| 6,089,531 A | 7/2000 | Young | |
| 6,302,374 B1 | 10/2001 | Fink | |

(Continued)

FOREIGN PATENT DOCUMENTS

| | | | | |
|---|---|---|---|---|
| EP | 1998094 A1 * | 12/2008 | ............. | F16K 41/04 |
| WO | WO-2015024468 A1 * | 2/2015 | ............. | F16K 1/222 |

OTHER PUBLICATIONS

International Searching Authority, "International Search Report," dated Mar. 11, 2019 in connection with International Patent Application No. PCT/US2018/058909 (6 pages).

(Continued)

*Primary Examiner* — Marina A Tietjen
(74) *Attorney, Agent, or Firm* — Hanley, Flight & Zimmerman, LLC

(57) ABSTRACT

A bushing having a shaft seal is disclosed herein. An example apparatus includes a fluid valve body, a valve shaft disposed in the fluid valve body, and a bushing disposed on the valve shaft between the valve shaft and the fluid valve body. The bushing includes a first groove disposed on an inner surface of the bushing and a second groove disposed on an outer surface of the bushing. A first seal is disposed in the first groove to seal against the valve shaft and a second seal is disposed in the second groove to seal against the valve body.

20 Claims, 6 Drawing Sheets

(56) References Cited

U.S. PATENT DOCUMENTS

| | | | |
|---|---|---|---|
| 6,450,477 B1* | 9/2002 | Young | F16K 31/1262 |
| | | | 251/285 |
| 8,448,919 B2* | 5/2013 | Pervaiz | F16K 5/0485 |
| | | | 251/214 |
| 9,441,453 B2* | 9/2016 | Lymberopoulos | E21B 34/02 |
| 9,512,926 B2* | 12/2016 | Crochet, Sr. | F16K 1/2268 |
| 9,568,117 B2* | 2/2017 | Adams | F16K 31/1221 |
| 9,759,240 B2* | 9/2017 | McEvoy | F15B 15/10 |
| 2004/0135112 A1* | 7/2004 | Greeb | E21B 34/02 |
| | | | 251/214 |
| 2005/0087712 A1* | 4/2005 | Lymberopoulos | F16K 3/0254 |
| | | | 251/77 |
| 2008/0115629 A1 | 5/2008 | Ayer et al. | |
| 2011/0240126 A1* | 10/2011 | Lymberopoulos | |
| | | | F16K 31/1262 |
| | | | 137/1 |
| 2012/0227983 A1* | 9/2012 | Lymberopoulos | E21B 34/02 |
| | | | 166/373 |
| 2016/0201808 A1* | 7/2016 | Zhang | F16K 1/2261 |
| | | | 251/306 |

OTHER PUBLICATIONS

International Searching Authority, "Written Opinion," dated Mar. 11, 2019 in connection with International Patent Application No. PCT/US2018/058909 (6 pages).

* cited by examiner

BUSHING HAVING A SHAFT SEAL

FIELD OF THE DISCLOSURE

This disclosure relates generally to fluid valves and, more particularly, to a bushing having a shaft seal.

BACKGROUND

Process control systems use fluid valves to control the flow of process fluids. A fluid valve typically controls the flow of a process fluid by moving a valve flow control member such as a plug or a disc. Many fluid valves include a bushing to guide and support a shaft or stem of the valve. Fluid valves also generally include a packing surrounding the shaft or stem. The packing may be composed of graphite, polytetrafluorethylene (PTFE), or metallic materials to prevent fluid leaks and/or undesired changes in fluid pressure. In many known valves that include a packing and a bushing, the valve shaft or stem must be long enough to accommodate the packing and the bushing. In some instances, such as the Fisher Z500, a one-fourth turn on/off floating ball valve, the only shaft support is provided by the valve packing and does not include a bushing. Using the valve packing to support the shaft enables use of a relatively short shaft, but subjects the valve packing to relatively high loads, which can shorten the life of the packing and/or may result in a valve that requires more torque to operate than initially intended.

SUMMARY

An example apparatus disclosed herein includes a fluid valve body, a valve shaft disposed in the fluid valve body, and a bushing disposed on the valve shaft between the valve shaft and the fluid valve body. The bushing includes a first groove disposed on an inner surface of the bushing and a second groove disposed on an outer surface of the bushing. A first seal is disposed in the first groove to seal against the valve shaft and a second seal is disposed in the second groove to seal against the valve body.

Another example apparatus disclosed herein includes a bushing configured to support a valve shaft in a valve body. The bushing includes seal grooves to receive respective seals to prevent fluid from exiting the valve body.

Yet another example apparatus disclosed herein includes a valve shaft, a valve body holding the valve shaft, and a means for supporting and sealing the valve shaft relative to the valve body.

Figure 1:
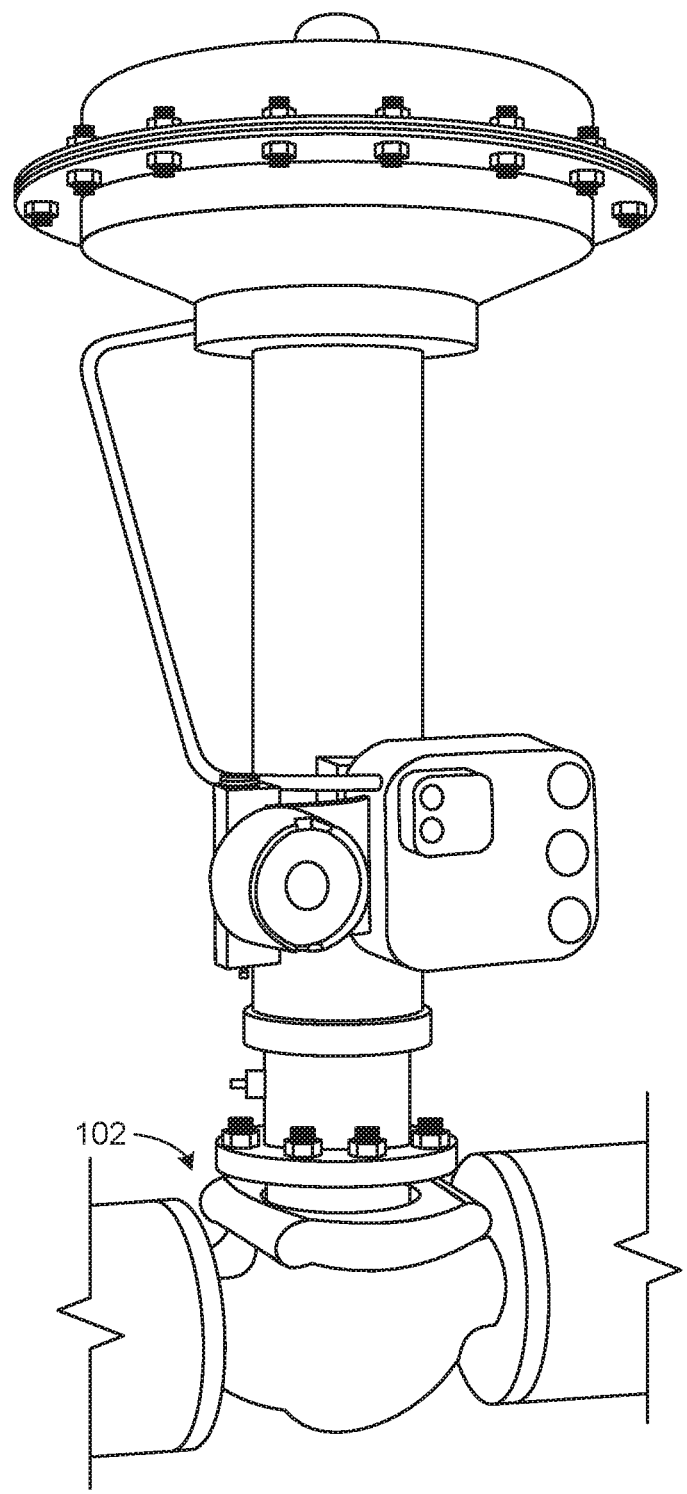
FIG. 1 illustrates a known fluid control valve.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

As used herein, the term "shaft" or "valve shaft" may include shafts or stems of various fluid control valves. In some examples, the term "shaft" may include a shaft of a rotary valve, while in other examples, the term "shaft" may include a stem of a sliding stem valve.

Fluid control devices (e.g., valves) typically include a valve body, a bonnet, an actuator, a flow control member (e.g., a plug), and a valve shaft or stem. The actuator moves the shaft through the bonnet to open and close the valve by moving the flow control member in the valve body to allow or restrict fluid flow. Many known fluid valves use a bushing to surround and support the valve shaft to minimize lateral movement of the shaft to prevent damage to the valve. Many known fluid valves also use a packing or seal to prevent fluid leaks and undesired changes in pressure inside the valve. These known fluid valves require the valve shaft to be long enough to accommodate both the bushing and the packing. In some instances, a manufacturer may choose to extend the bushing to increase the support of the shaft. However, extending the bushing may require a shorter packing, which may result in a greater chance of fluid leaks. In other instances, a manufacturer may choose to extend the packing to decrease the likelihood of a fluid leak. However, extending the packing may require a shorter bushing, which may result in inadequate support of the valve shaft.

Further issues arise if a valve shaft is not long enough to provide adequate space for both a packing and a bushing. Thus, in some known valves, the shaft may only be supported by the valve packing. If the packing is composed of a soft material (e.g., graphite, PTFE, etc.), the packing may yield and/or leak if too much side load or bending moment is imparted to the packing. If this occurs, the valve shaft may contact the valve body and galling can occur. As a result, the valve may require a significantly higher torque to operate than intended, and/or the valve may require service requests and/or warranty repair, which results in additional time and costs.

Example fluid valves disclosed herein employ a bushing having an integral seal in place of the above-mentioned known bushing and packing. By using the example bushing described herein, a fluid valve can provide sufficient support for the valve shaft, while also reducing the possibility of fluid leaks. Also, the example bushing described herein does not require as much space as a separate bushing and packing. Therefore, a shorter valve shaft may be used to reduce the overall size of a valve.

FIG. 1 illustrates an example fluid valve 102 in which the examples disclosed herein may be implemented. In the illustrated example of FIG. 1, the fluid valve 102 can be a sliding stem valve, a rotary valve, etc. that is operable to control flow of a process fluid (e.g., natural gas, water, etc.) flowing through the fluid valve 102. In this example, the fluid valve 102 is a sliding stem valve. A valve plug or flow control member 202 (shown in FIG. 2) controls flow of the process fluid. In the illustrated example, when the fluid valve 102 is in the closed state, the process fluid is substantially prevented from flowing through the valve 102. Conversely, when the fluid valve 102 is in the open state, the process fluid is enabled to flow through the valve 102.

Figure 2:
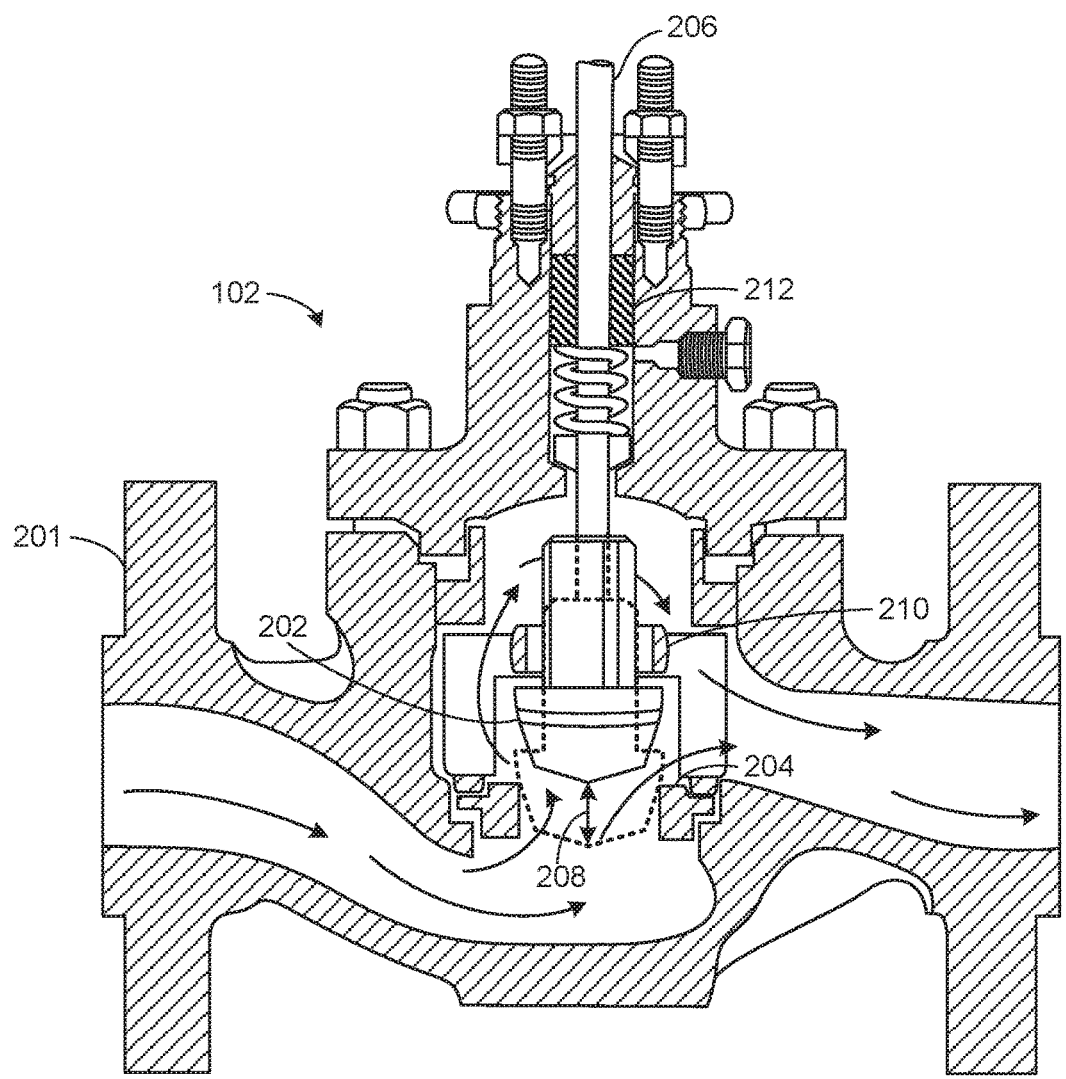
FIG. 2 illustrates a partial cross-section of the fluid control valve of FIG. 1 showing a known bushing and packing.

FIG. 2 is a detailed cross-sectional view of the example fluid valve 102 of FIG. 1. The illustrated example includes a valve body 201 and the flow control member 202 within the valve body 201. The flow control member 202 may be any suitable valve plug (e.g., a cylindrical plug, a tapered plug, etc.) that varies the flow of the process fluid through the fluid valve 102 when moved relative to (e.g., toward and/or away from) a valve seat 204 via a valve shaft 206. In particular, the example flow control member 202 moves along a direction generally indicated by a double arrow 208 between an open position and a closed position of the fluid valve 102. To ensure stability of the valve shaft 206 when moving between the open and closed positions, a bushing 210 is placed around the flow control member 202. A valve packing 212 is also included to prevent fluid leaks and any unwanted pressure changes within the fluid valve 102. In this known fluid valve 102, the packing 212 is near the upper end of the valve shaft 206 in the orientation of FIG. 2, and the bushing 210 surrounds the flow control member 202. However, in other known fluid valves, the packing 212 and the bushing 210 may be in any positions along the valve shaft 206 and/or the flow control member 202.

Figure 3A:
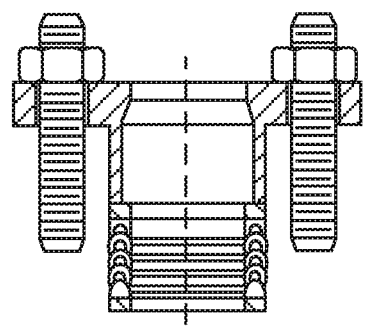
FIGS. 3A-3D illustrate other known valve packing configurations.
Figure 3C:
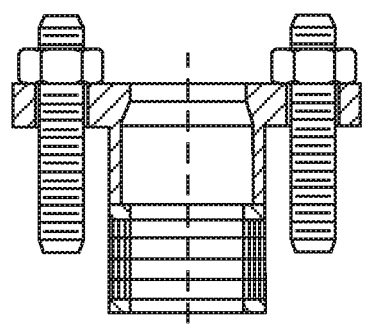
Figure 3B:
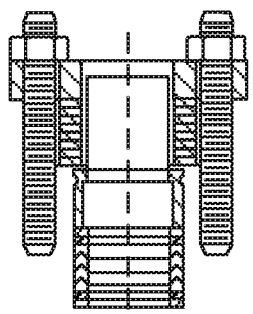

FIGS. 3A-3D are examples of known valve packing configurations that are used in fluid control valves such as the fluid control valve 102 of FIGS. 1 and 2. FIG. 3A illustrates a PTFE (e.g., TEFLON®, etc.) V-ring packing 302. FIG. 3B illustrates a single PTFE packing 304. The PTFE packing techniques of FIGS. 3A and 3B are generally used in fluid control valves that have fluids flowing through the valve at low temperatures (i.e., below 450 degrees Fahrenheit).

Figure 3D:
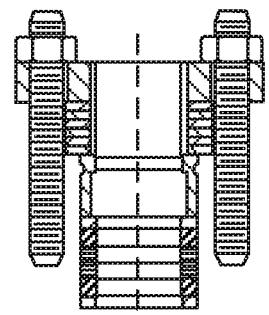

FIG. 3C illustrates a graphite ribbon packing 306. FIG. 3D illustrates a graphite packing 308. The graphite packing techniques of FIGS. 3C and 3D are generally used in fluid control valves that have fluid flowing through the valve at high temperatures (i.e., above 450 degrees Fahrenheit) as graphite has a much higher melting point than PTFE.

Figure 4:
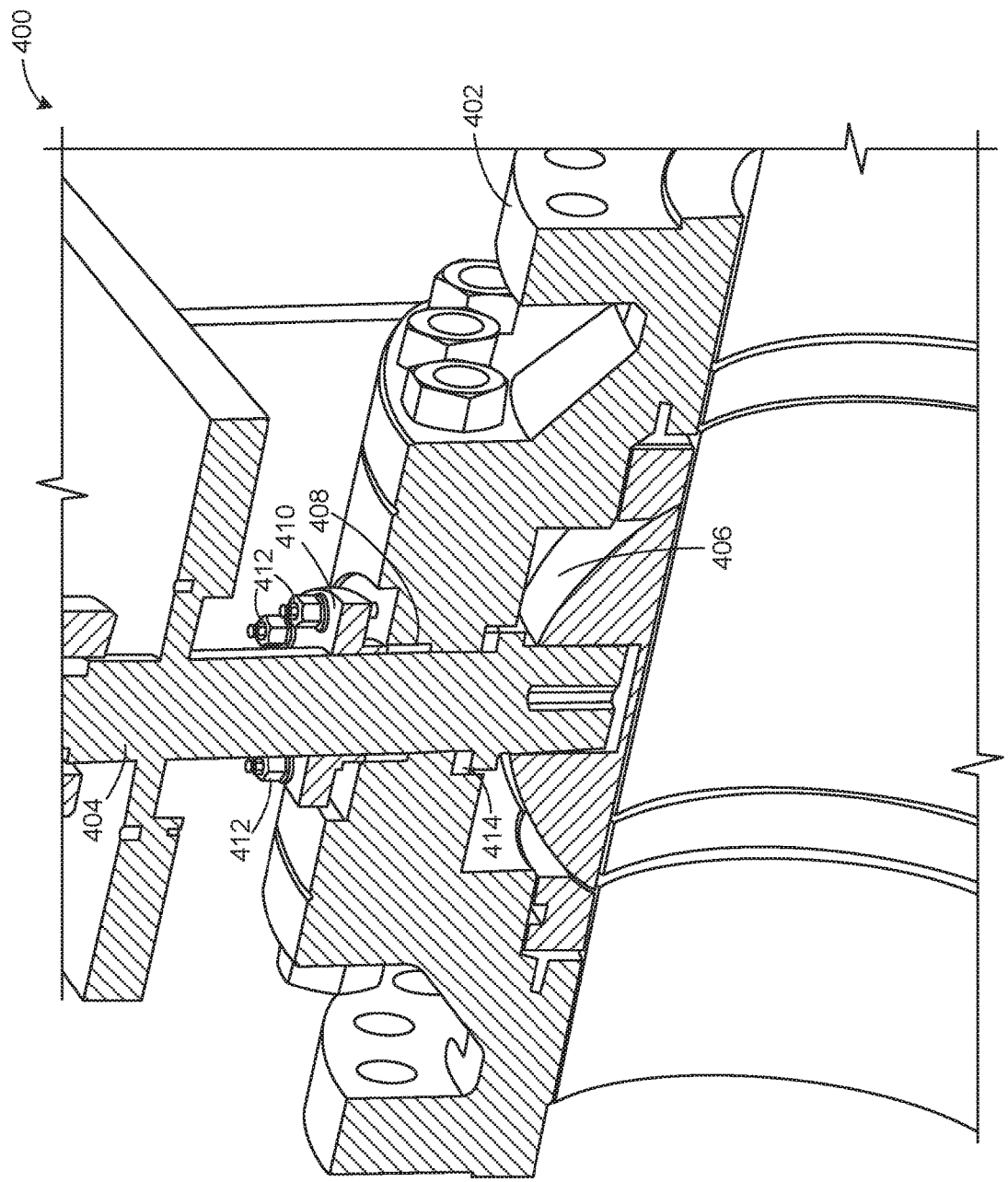
FIG. 4 illustrates a partial cross-section of a known fluid control valve.

FIG. 4 is a cross-sectional view of a known valve 400. The depicted known valve 400 is a one-fourth turn on/off floating ball valve. While the example bushing described herein may be used in any fluid control valve, the example bushing described herein is designed to be particularly useful in one-fourth turn on/off valves such as the known valve 400 of FIG. 4. The valve 400 of FIG. 4 includes a valve body 402 and a valve shaft 404 to rotate a ball valve 406 to open and close the valve 400. A packing 408 is disposed between the valve body 402 and the valve shaft 404. The packing 408 is the graphite ribbon packing configuration 306 of FIG. 3C. The packing 408 is the only shaft support provided for the valve shaft 404. Therefore, if too much torque or lateral movement is imparted to the valve shaft 404, the packing 408 may yield and leak. To secure the packing 408, a packing flange 410 is placed above the packing 408 around the valve shaft 404 and secured with packing studs 412.

FIG. 4 further includes a thrust washer 414 between the valve body 402 and the valve shaft 404. The thrust washer 414 is generally a soft material (e.g., polyoxymethylene (POM), PTFE, peak, brass, etc.) to reduce the amount of damage that may be caused by the friction of metal to metal contact between the valve body 402 and the valve shaft 404 as the valve shaft 404 rotates relative to the valve body 402.

Figure 5A:
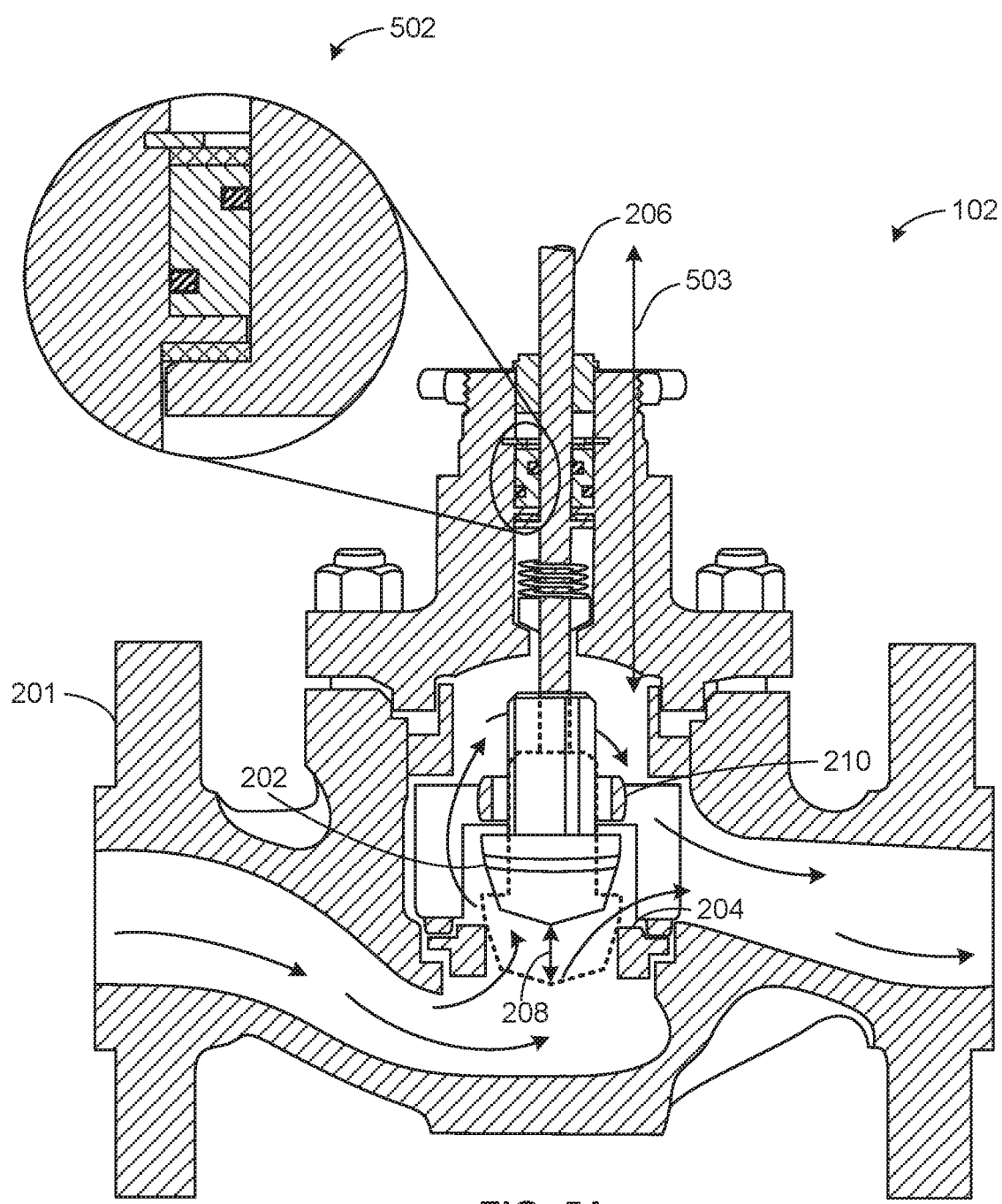
FIG. 5A illustrates an example bushing used to support and seal the valve shaft of the fluid control valve of FIG. 2 in accordance with the present disclosure.

FIG. 5A illustrates the example fluid control valve 102 of FIGS. 1 and 2 including a bushing 502 in accordance with the teachings of this disclosure. The example bushing 502 is disposed between the valve body 201 and the valve shaft 206 of FIG. 2. The valve shaft 206 has a length 503. The example bushing 502 is described in further detail in connection with FIG. 5B. In this example, the bushing 502 is disposed in place of the packing 212 in FIG. 2. However, in other examples, the example bushing 502 may be located anywhere along the valve shaft 206. Additionally, this example includes the bushing 210 around the flow control member 202 to increase stability because the valve shaft 206 is long enough to accommodate both the bushing 502 and the bushing 210. However, in other examples, the valve shaft 206 may be shorter and may only include the bushing 502 without the bushing 210.

Figure 5B:
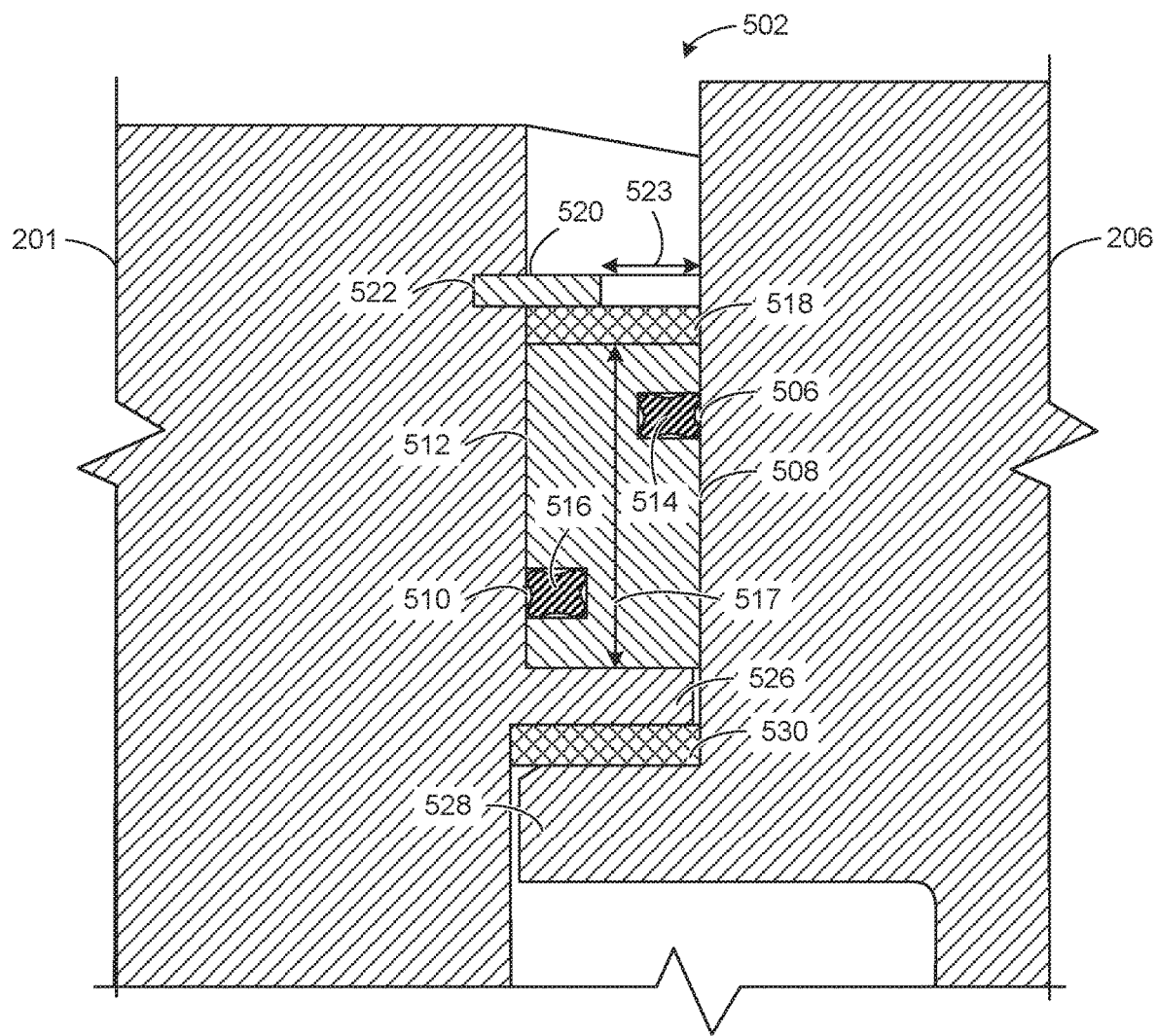
FIG. 5B illustrates an enlarged cross-section of the bushing of FIG. 5A.

FIG. 5B illustrates an enlarged cross-sectional view of the example bushing 502 of FIG. 5A. The example bushing 502 is disposed on the valve shaft 206 between the valve shaft 206 and the valve body 201. The bushing 502 is configured to support the valve shaft 206 in the valve body 201. The bushing 502 includes a first groove 506 disposed on an inner surface 508 of the bushing 502, wherein the inner surface 508 of the bushing 502 is in contact with the valve shaft 206. The bushing 502 also includes a second groove 510 disposed on an outer surface 512 of the bushing 502, wherein the outer surface 512 of the bushing 502 is in contact with the valve body 201. The bushing 502 further includes a first seal 514 disposed in the first groove 506 to seal against the valve shaft 206 and a second seal 516 disposed in the second groove 510 to seal against the valve body 201.

The bushing 502 is made of any material suitable to support the valve shaft 206 such as, for example POM, PTFE, lined metal, coated metal, etc. In this example, the bushing 502 has a length 517 that is less than the length 503 of the valve shaft 206 of FIG. 5A. However, in other examples, the bushing 502 may extend substantially the entire length 503 of the valve shaft 206. Further, in this example, the seals 514, 516 may be implemented using X-ring seals (e.g., QUAD-RING® seals, etc.), while in other examples, the seal(s) may be o-ring seals having circular cross-sections, lip seal (e.g., OMNI SEAL®, etc.), or any seals to prevent fluid from exiting the valve body 201.

The example of FIGS. 5A and 5B illustrate two seals 514, 516 with the first seal 514 in the first groove 506 on the inner surface 508 of the bushing 502, and the second seal 516 in the second groove 510 on the outer surface 512 of the bushing 502. However, in other examples, there may be any number of seals and seal grooves in the bushing 502 in any other configuration.

FIG. 5B also includes a support ring 518 abutting the bushing 502 to retain the bushing 502 between the valve body 201 and the valve shaft 206 and a snap ring 520 coupled to the valve body 201 to retain the bushing 502 and the support ring 518. The snap ring 520 may be composed of metal and is disposed within a groove 522 of the valve body 201. The snap ring 520 replaces the packing flange 410 and the packing studs 412 of FIG. 4. The support ring 518 may be composed of metal and is disposed between the snap ring 520 and the bushing 502. In this example, the snap ring 520 may not be sufficient to retain the bushing 502 without the extra support of the support ring 518 because the softer material (e.g., POM (e.g, DELRIN®, etc.), PTFE, lined metal, coated metal, etc.) of the bushing 502 may slip through a gap 523 between the snap ring 520 and the valve shaft 206. The addition of the support ring 518 eliminates this possibility. In other examples, however, the snap ring 520 may have a width wider than the snap ring 520 in this example. In such an example, the support ring 518 may not be necessary.

Further illustrated in FIG. 5B is a flange 526 of the valve body 201 and a flange 528 of the valve shaft 206. In this example, the flange 526 of the valve body 201 is positioned at the lower end of the bushing 502 and in contact with the bushing 502 to prevent the bushing 502 from sliding down the valve shaft 206. Further in this example, the flange 528 of the valve shaft 206 is below the flange 526 of the valve body 201 to reinforce the flange 526 in preventing the bushing 502 from sliding down the valve shaft 206. The flange 526 and the flange 528 are separated by a thrust washer 530 similar to the thrust washer 414 of FIG. 4. The thrust washer 530 is composed of a soft material (e.g., POM, PTFE, peak, brass, etc.) to decrease the amount of friction between the flange 526 and the flange 528. While this example includes the flange 526 positioned above the flange 528, other examples may include the flange 526 and the flange 528 in any other configuration (e.g., the flange 528 above the flange 526, etc.). In further examples, there may be only one flange extending from either the valve body 201 or the valve shaft 206. In even further examples, there may be a different structure to facilitate ensuring the bushing stays in place.

In the illustrated example of FIGS. 5A and 5B, a means for supporting and sealing the valve shaft 206 relative to the valve body 201 includes the example bushing 502. Further, in the illustrated example of FIGS. 5A and 5B, a first means for retaining the means for supporting and sealing includes the support ring 518. Also, in this example, a second means for retaining includes the snap ring 520.

From the foregoing, it will be appreciated that the above disclosed apparatus and articles of manufacture increase leakage protection and provide additional support to a valve shaft or stem of fluid control valves. As a result, less time and costs are incurred to repair damaged valves due to lack of support of the valve shaft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a fluid valve body including a first flange;
a flow control member within the fluid valve body;
a valve shaft disposed in the fluid valve body and including a second flange;
a washer; and
a bushing disposed on the valve shaft between the valve shaft and the fluid valve body, the bushing including a first groove disposed on an inner surface of the bushing and a second groove disposed on an outer surface of the bushing, a first seal disposed in the first groove to seal against the valve shaft and a second seal disposed in the second groove to seal against the valve body, the first flange disposed on a first end of the bushing, the washer disposed adjacent to the first flange, the second flange disposed adjacent to the washer, the second flange disposed closer to the flow control member than the washer, the washer disposed closer to the flow control member than the first flange, the first flange closer to the flow control member than the bushing.

2. The apparatus of claim 1, further including a support ring to retain the bushing, the support ring disposed on a second end of the bushing, the second end opposite the first end.

3. The apparatus of claim 2, further including a snap ring coupled to the valve body to retain the bushing and the support ring, the valve body not including a packing flange or a packing stud.

4. The apparatus of claim 1, wherein the each of the seals is an O-ring, an X-ring, or a lip seal.

5. The apparatus of claim 1, wherein the bushing includes polyoxymethylene (POM), polytetrafluorethylene (PTFE), or a metal having a liner or coating.

6. The apparatus of claim 1, wherein the bushing prevents fluid from exiting the valve body without packing disposed between the valve body and the valve shaft.

7. An apparatus, comprising:
a first flange;
a second flange;
a washer; and
a bushing configured to support a valve shaft in a valve body, the bushing including seal grooves to receive respective seals to prevent fluid from exiting the valve body, the bushing disposed above and adjacent to the first flange, the bushing disposed above the second flange, the first flange separated from the second flange by the washer.

8. The apparatus of claim 7, further including seals positioned in the seal grooves.

9. The apparatus of claim 8, wherein the each of the seals is an O-ring, an X-ring, or a lip seal.

10. The apparatus of claim 7, wherein an inner surface of the bushing is configured to be in contact with the valve shaft and an outer surface of the bushing is configured to be in contact with the valve body, the inner surface including at least one of the seal grooves and the outer surface including at least another one of the seal grooves.

11. The apparatus of claim 7, further including a support ring abutting a top end of the bushing.

12. The apparatus of claim 11, further including a snap ring configured to be coupled to the valve body to retain the support ring and the bushing, the snap ring configured to be disposed above the support ring, the snap ring configured to replace a packing flange.

13. The apparatus of claim 7, wherein the bushing includes polyoxymethylene (POM), polytetrafluorethylene (PTFE), or a metal having a liner or a coating.

14. An apparatus, comprising:
a valve shaft including a first flange;
a valve body holding the valve shaft, the valve body including a second flange;
a flow control member within the valve body;
a washer; and
means for supporting and sealing the valve shaft relative to the valve body, the first flange abutting a lower surface of the means for supporting and sealing, the washer disposed adjacent to the first flange, the second flange disposed adjacent to the washer, the second flange disposed closer to the flow control member than the washer, the washer disposed closer to the flow control member than the first flange, the first flange closer to the flow control member than the means for supporting and sealing.

15. The apparatus of claim 14, wherein the means for supporting and sealing includes a plurality of seals and grooves to hold the seals to prevent fluid from exiting the valve body without packing disposed between the valve body and the valve shaft.

16. The apparatus of claim 15, wherein the seals and grooves are on inner and outer surfaces of the means for supporting and sealing the valve shaft.

17. The apparatus of claim 15, wherein the grooves are two grooves, one of the grooves being on an outer surface of the means for supporting and sealing the valve shaft and the other one of the grooves being on an inner surface of the means for supporting and sealing the valve shaft.

18. The apparatus of claim 15, wherein each of the plurality of seals is an O-ring, an X-ring, or a lip seal.

19. The apparatus of claim 14, further including a first means for retaining the means for supporting and sealing, the support ring disposed on a top end of the means for supporting and sealing.

20. The apparatus of claim 19, further including a second means for retaining in contact with the first means for retaining.

* * * * *